United States Patent
Cheung

(10) Patent No.: US 7,740,397 B2
(45) Date of Patent: Jun. 22, 2010

(54) CULINARY WHISK

(75) Inventor: Po Wo Paul Cheung, New Territories (HK)

(73) Assignee: Maxpat Trading & Marketing (Far East) Limited, Hong Kong (HK)

( * ) Notice: Subject to any disclaimer, the term of this patent is extended or adjusted under 35 U.S.C. 154(b) by 0 days.

(21) Appl. No.: 11/733,948

(22) Filed: Apr. 11, 2007

(65) Prior Publication Data

US 2008/0117712 A1    May 22, 2008

(30) Foreign Application Priority Data

Nov. 17, 2006   (GB) .................................. 0623008.0

(51) Int. Cl.
*A47J 43/10* (2006.01)
(52) U.S. Cl. ...................... 366/129; 366/343; 416/70 R
(58) Field of Classification Search ............... 74/502.5;
156/92, 95, 138, 244.18, 244.23, 257; 427/289,
427/290; 474/80; 416/70, 224, 70 R; 366/129,
366/343, 143; 29/457–460, 527.2, 527.4;
59/83; 83/947; 428/379–384, 390–391,
428/397–400, 309, 609, 375, 369–371; 72/95–126,
72/339; 280/480; 440/34; 114/242; 57/311,
57/9, 200, 219; 231/4; *B21F 19/00; A47J 43/10;
B66B 11/04*
See application file for complete search history.

(56) References Cited

U.S. PATENT DOCUMENTS

| | | | | | |
|---|---|---|---|---|---|
| 309,439 | A | * | 12/1884 | Chillingworth et al. | ..... 428/609 |
| 2,583,026 | A | * | 1/1952 | Swift | ..... 174/117 R |
| 3,131,471 | A | * | 5/1964 | Nieter | ..... 29/521 |
| 5,075,175 | A | * | 12/1991 | Matsui et al. | ..... 428/582 |
| 5,495,668 | A | * | 3/1996 | Furusawa et al. | ..... 29/874 |
| 5,688,045 | A | * | 11/1997 | Butte | ..... 366/129 |
| 6,257,752 | B1 | | 7/2001 | Browne | ..... 366/129 |
| 6,273,602 | B1 | * | 8/2001 | Steiner et al. | ..... 366/129 |
| 6,454,456 | B2 | * | 9/2002 | Browne | ..... 366/129 |
| 7,213,964 | B2 | * | 5/2007 | Holcomb et al. | ..... 366/129 |
| 7,296,921 | B2 | * | 11/2007 | Browne et al. | ..... 366/129 |
| 7,428,775 | B2 | * | 9/2008 | Holcomb et al. | ..... 29/527.1 |

(Continued)

FOREIGN PATENT DOCUMENTS

CN    1622781    6/2005

(Continued)

OTHER PUBLICATIONS

Office Action issued by the Chinese Patent Office on Feb. 13, 2009 in connection with corresponding Chinese Patent Application No. 2007101050328 and English translation thereof.

*Primary Examiner*—David L Sorkin
*Assistant Examiner*—Andrew Janca
(74) *Attorney, Agent, or Firm*—Ostrolenk Faber LLP

(57) ABSTRACT

There is provided a culinary whisk comprising one or more wire loops for mixing foodstuffs, the or at least one of the wire loops includes an inner metallic wire portion and an outer polymeric portion enclosing the inner portion, wherein the inner portion is provided with groove(s) along substantially the length thereof for increasing frictional contact with the outer portion or means for fixedly adhering the outer portion to the inner wire portion whereby in use relative movement between the external portion and the internal portion is reduced.

12 Claims, 3 Drawing Sheets

U.S. PATENT DOCUMENTS

2005/0128864 A1 * 6/2005 Holcomb et al. ............ 366/129
2008/0117712 A1 * 5/2008 Cheung ...................... 366/129
2009/0238030 A1 * 9/2009 Hensler ...................... 366/129

FOREIGN PATENT DOCUMENTS

| DE | 202007005492 U1 | * | 10/2007 |
| EP | 453729 A2 | * | 10/1991 |
| GB | 2432543 B | * | 11/2007 |
| WO | WO 03/075728 | | 11/2002 |
| WO | WO 03/075728 A1 | | 9/2003 |

* cited by examiner

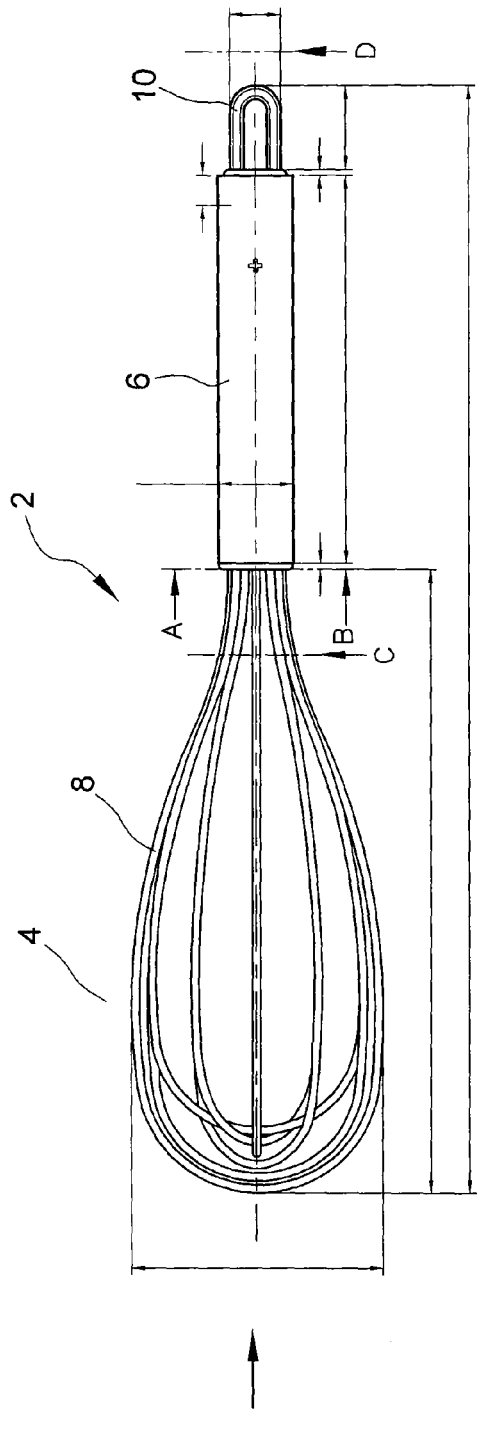
Fig.1
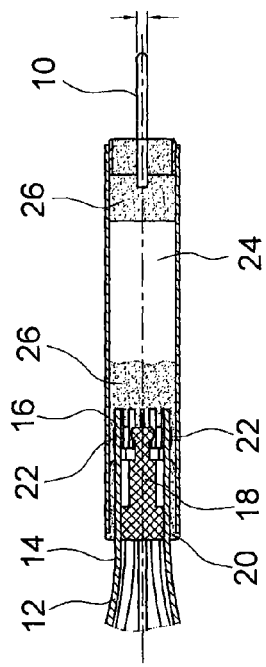
Fig.4
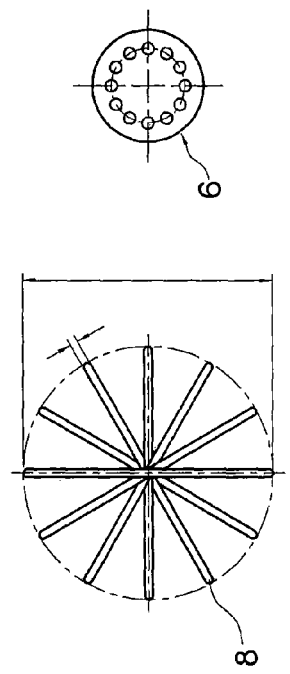
Fig.3
Fig.2

CULINARY WHISK

FIELD OF THE INVENTION

The present invention is concerned with culinary whisks and methods of the same.

BACKGROUND OF THE INVENTION

There are numerous types of culinary whisk in the market. Traditional culinary whisks generally comprise a utility portion made of a number of metal wire loops at one end and the utility portion is secured to a handle at the other end. In use, a user would hold on to the handle and use the utility to mix foodstuffs in a container. Although the use of metal wires is desirable to the extent that they are flexible and durable, they are not suitable if the container in which the foodstuff to be mixed is a non-stick container having a non-stick layer or Teflon layer. This is because in a whisking motion the metal wires would inevitably scratch the non-stick layer and would not only damage the container but also cause contamination of the food to be mixed.

The present invention seeks to not only address the problem of scratching but also seek to maintain a high level of efficiency to a whisking operation and/or improve the durability of the whisk, or at least to provide an alternative to the public.

SUMMARY OF THE INVENTION

According to a first aspect of the present invention, there is provided a culinary whisk comprising one or more wire loops for mixing foodstuffs, the or at least one of the wire loops includes an inner metallic wire portion and an outer polymeric portion enclosing said inner portion, wherein said inner portion is provided with groove(s) substantially along the length thereof for increasing frictional contact with the outer portion whereby in use relative movement between the external portion and the internal portion is reduced.

Preferably, the inner portion may be made of stainless steel. The outer portion may be made of silicone.

In one embodiment, the groove or grooves may be disposed along the length of the inner portion in a spiraling manner.

In another embodiment, the inner portion may be provided or means for fixedly adhering the outer portion to the inner wire portion.

The whisk may be a balloon whisk. The whisk may comprise six wire loops. The whisk may be of an elongate profile with the wire loop(s) disposed at one end thereof and a handle disposed at the other end. The wire loops may be partially received within and secured to the handle.

According to a second aspect of the present invention, there is provided a method of making a culinary whisk comprising steps of providing a metallic wire, introducing one or more grooves on the wire, providing a polymeric jacket on the wire, forming wire loops out of the jacketed wire, and securing the wire loops to a handle forming the culinary whisk. Preferably, the method may further comprise a step of introducing an adhesive agent for bonding the polymeric jacket the wire.

BRIEF DESCRIPTION OF THE DRAWINGS

Some embodiments in accordance with the present invention will be illustrated by way of example as follows, in which:

FIG. 1 shows a side view of a balloon whisk;
FIG. 2 is an end view of the whisk shown in FIG. 1;
FIG. 3 is a cross section view of the whisk taken at line A-B of FIG. 1;
FIG. 4 is a cross second view of the whisk taken at line C-D of FIG. 1.

DETAILED DESCRIPTION OF PREFERRED EMBODIMENTS OF THE PRESENT INVENTION

Figure 5:
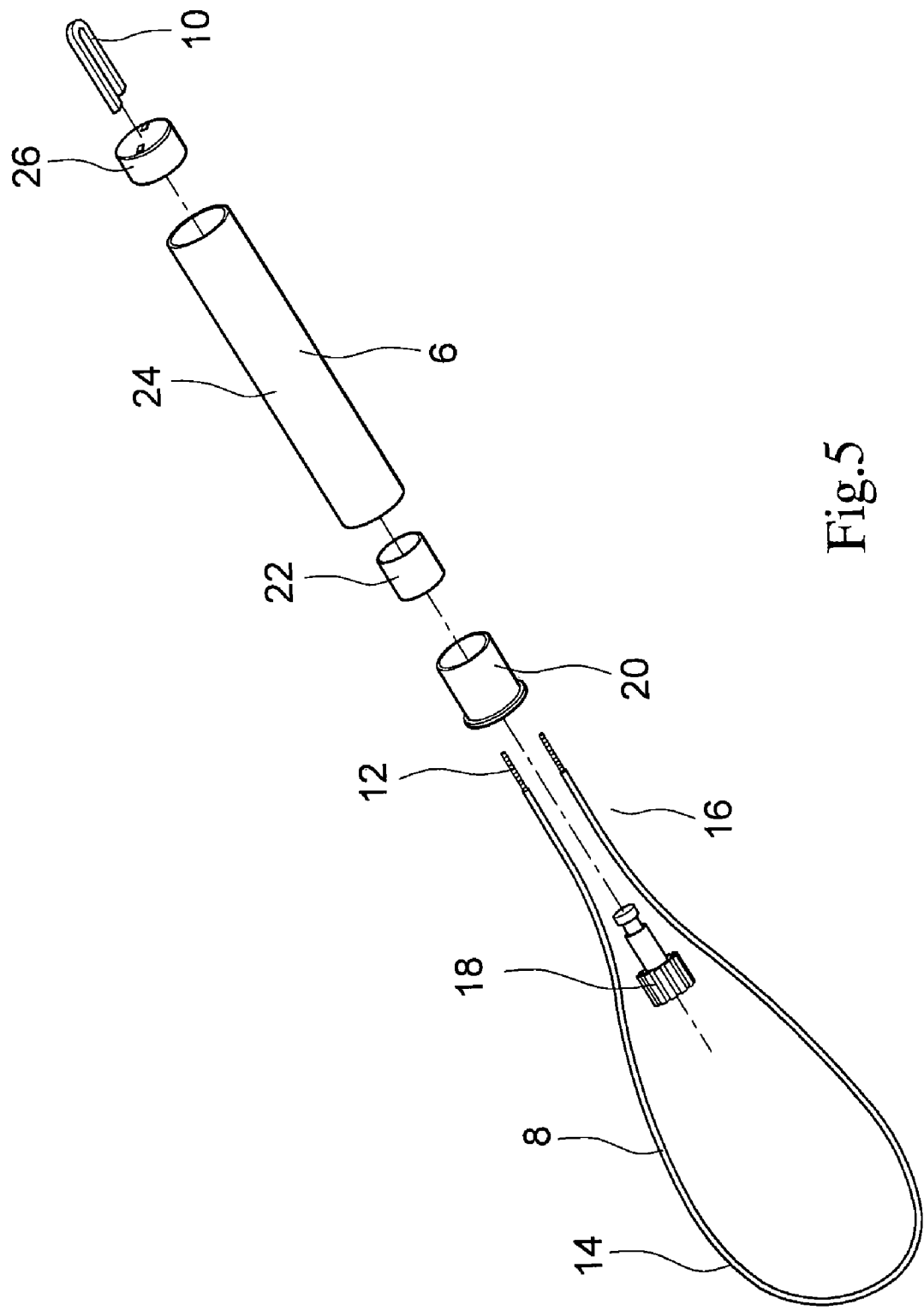
FIG. 5 is an exploded view showing generally the whisk of FIG. 1 schematically; although for illustration purpose some wire loops are omitted therefrom.

Referring to FIG. 1 and FIG. 2, there is shown an embodiment of a culinary whisk 2 according to one aspect of the present invention. The culinary whisk 2 is generally elongate in shape with a utility portion 4 at one end connected to a handle 6 at the other end. The utility portion 4 comprises a number of wire loops 8 and in this embodiment there are six of these wire loops 8. The handle 6 is provided with a hook 10 at the rear end. FIG. 3 and FIG. 4 show the connection of the utility portion 4 to the handle 6. FIG. 5 is an exploded diagram of the whisk 2 although only one of the wire loops 8 is shown for clarity reason.

As first seen in FIG. 5, the wire loop 8 has an inner portion 12 made of a metallic wire. The wire loop has an outer portion 14 made of a polymeric material. In this embodiment, the inner portion 12 is made of stainless steel and the outer portion is made of silicone. The wire loop 8 is constructed such that the stainless steel wire 12 is enveloped by the silicone jacket 14. However, ends 16 of the wire loop 8 are constructed such that the stainless steel wire 12 protrudes from the silicone jacket 14 such that the ends 16 are received and can be secured within the front end of the handle 6. The whisk 2 further comprises a gasket 18, a plastic resin insert 20 with a ring like structure, a metal ring 22, a tube-like handle body 24 and an end cap 26. The silicone gasket 18 has a number of teeth evenly spaced around its circumference thus defining recesses between the teeth. End portion of each of the wire loops 8 are situated on opposite sides of the gasket 18 between the respective teeth. The gasket 18 together with the wire loops 8 are inserted within the plastic resin insert 20 and the gasket 18 which together serve to maintain the relative distance between the ends 16 of the wire loop 8. FIG. 4 shows that the wire loops 8 protrude from and beyond the plastic resin insert 20. To further secure the wire loops 8, the ends thereof are welded to the metal ring 22 at their farthest end thus forming a wire loop assembly. The wire loop assembly is then inserted into a handle body 24 and secured thereat by cement 26. The hook 10 is likewise secured to the rear end of the handle 6 by cement 26.

Figure 6:
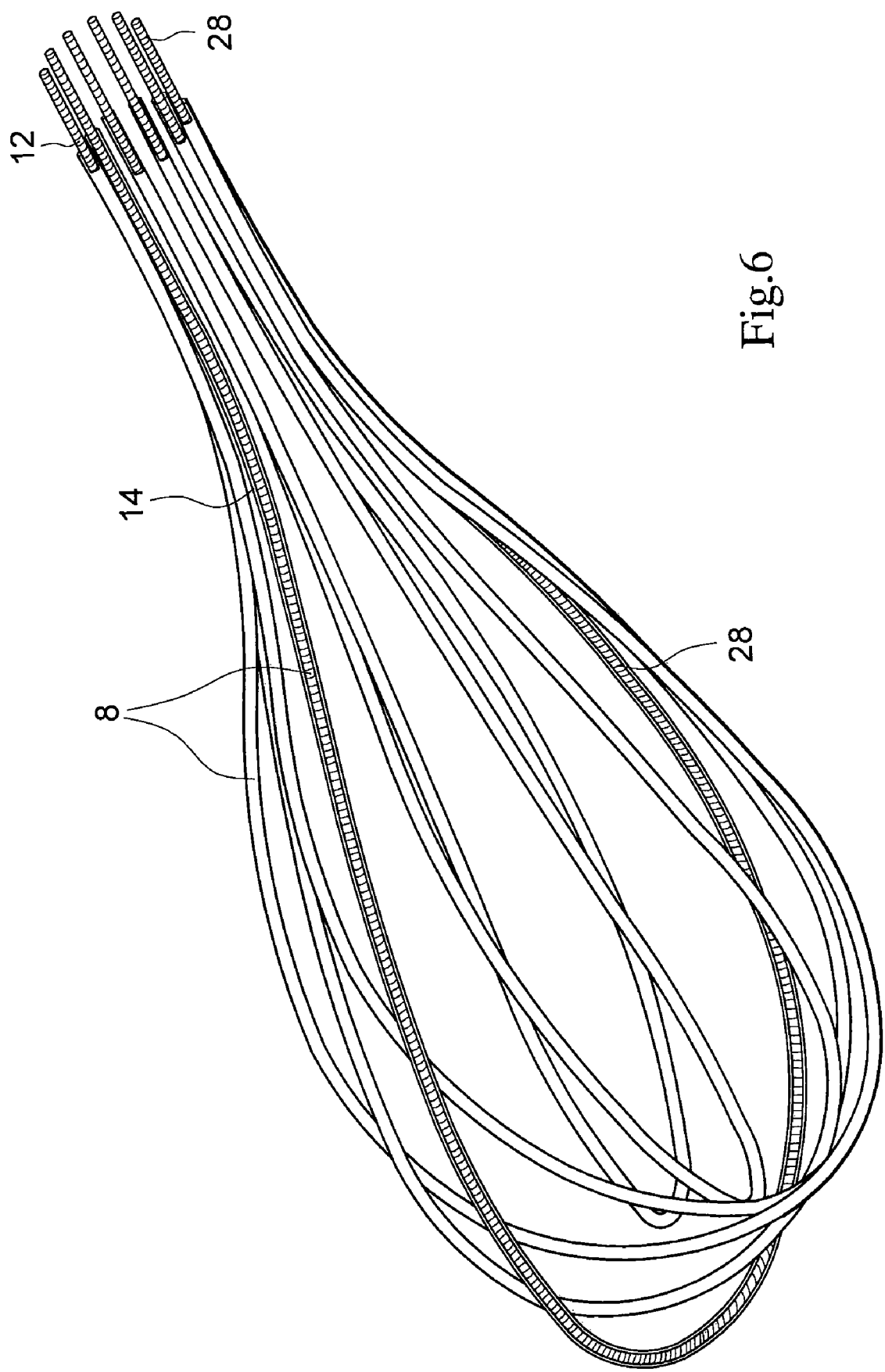
FIG. 6 is a perspective view showing generally a utility portion of the whisk of FIG. 1 schematically, except for illustration purpose the inner construction of one of the wire loops is illustrated.

The wire loops 8 of the whisk 2 are different to the explained as follows. FIG. 5 and FIG. 6 illustrate the wire loops. FIG. 6 is schematic in nature in that one of the wire loops 8 is presented as a see-through view. The inner portion 12 of the wire loop 8 has grooves 28 spiraling along its length. These grooves 28 are introduced to the inner wire portion 12 before the silicone jacket 14 is introduced to envelope the inner wire portion 12. Although not shown in the figures an adhesive is introduced while the inner wire portion 12 is being jacketed by the outer portion. One function of the grooves 28 is to increase the frictional contact between the inner and outer portions 12, 14 such that relative axial movement and rotational movement is minimized if not totally eliminated.

The introduction of the adhesive increases the bonding of the inner and outer portion 12, 14 such that the inner and outer portions 12, 14 become integrally formed. The advantage of this construction is at least three-fold. First, the use of a soft outer portion 14 prevents the scratching of non-stick surfaces. Second, the introduction of grooves 28, and in particular spiraling grooves, along the length of the metal wires 12 minimizes the relative axial, rotational and lateral movement between the inner portion and outer portion in use. Studies indicate that this can actually improve the whisking efficiency in at least some whisking operation. Third, with the minimized relative movement, the wire loops 8 are more durable.

In an alternative embodiment, only the grooves but not the adhesive are introduced to the inner metal wire. Yet in another embodiment, only the adhesive but not the grooves are introduced to the inner metal wire. However, experiments have shown that the use of grooves is more effective in reducing the relative movement over time because they are durable. Adhesives tend to lose their characteristics over time and the bonding could weaken.

The invention claimed is:

1. A culinary whisk comprising at least one wire loop for mixing foodstuffs, said at least one wire loop including:
   an inner metallic wire portion having a groove along a length thereof;
   an outer polymeric portion enclosing said inner metallic wire portion; and
   an adherer positioned and configured to adhere said outer polymeric portion to said inner metallic wire portion,
   wherein the groove is positioned and configured to increase frictional contact with said outer polymeric portion and thereby in use to reduce relative movement between said outer polymeric portion and said inner metallic wire portion.

2. A whisk as claimed in claim 1, wherein said inner metallic wire portion is made of stainless steel.

3. A whisk as claimed in claim 1, wherein said outer polymeric portion is made of silicone.

4. A whisk as claimed in claim 2, wherein said outer polymeric portion is made of silicone.

5. A whisk as claimed in claim 1, wherein said groove is positioned in a spiraling manner along the length of said inner metallic wire portion.

6. A whisk as claimed in claim 2, wherein said groove is positioned in a spiraling manner along the length of said inner metallic wire portion.

7. A whisk as claimed in claim 3, wherein said groove is positioned in a spiraling manner along the length of said inner metallic wire portion.

8. A whisk as claimed in claim 1, wherein said whisk is a balloon whisk.

9. A whisk as claimed in claim 1, wherein the at least one wire loop comprises six wire loops.

10. A whisk as claimed in claim 1, wherein said whisk is of an elongate profile with said at least one wire loop positioned at one end of the whisk and a handle positioned at an other end of the whisk.

11. A whisk as claimed in claim 10, wherein said at least one wire loop is partially received within and secured to said handle.

12. A method of making a culinary whisk comprising steps of:
   providing a metallic wire;
   introducing at least one groove on said metallic wire;
   introducing an adhesive agent for bonding a polymeric jacket to the wire;
   providing the polymeric jacket on said metallic wire to form a jacketed wire and for adhering the jacket to the wire by the adhesive agent;
   forming wire loops out of the jacketed wire, and
   securing said wire loops to a handle forming said culinary whisk,
   wherein the at least one groove on the metallic wire is positioned and configured to increase frictional contact with the polymeric jacket on the wire and thereby in use to reduce relative movement between the polymeric jacket and the metallic wire.

* * * * *